April 23, 1957   D. M. JACKSON   2,789,847
SEALING RING FOR SWIVEL
Filed Aug. 3, 1953
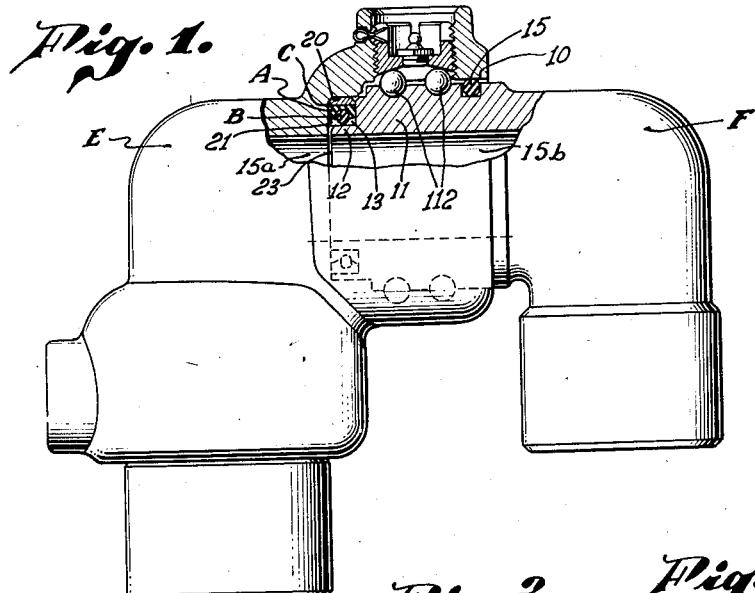
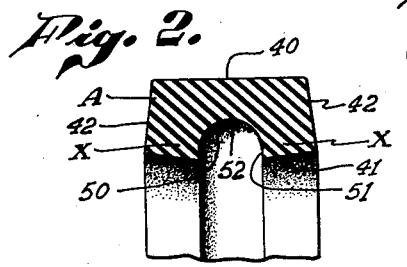
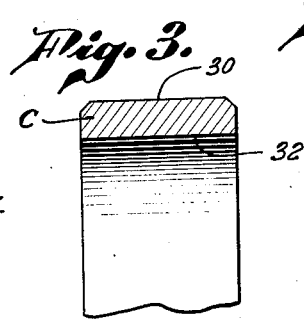
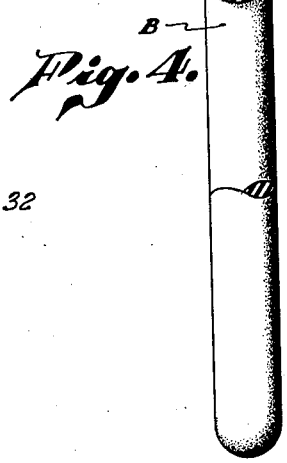
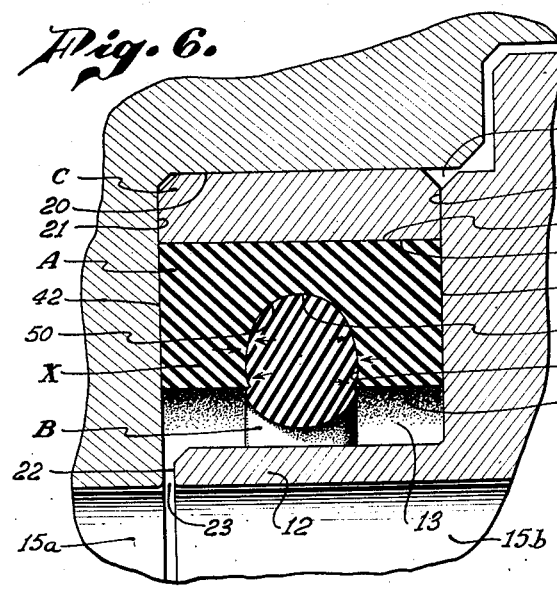
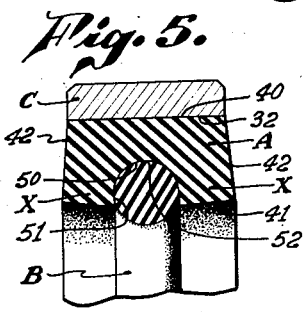
INVENTOR.
DONALD M. JACKSON,
BY
Attorney.

United States Patent Office 2,789,847
Patented Apr. 23, 1957

2,789,847

SEALING RING FOR SWIVEL

Donald M. Jackson, Fullerton, Calif., assignor to Chiksan Company, Brea, Calif., a corporation of California Application August 3, 1953, Serial No. 371,844

2 Claims. (Cl. 288—1)

This invention has to do with a sealing ring or sealing means for swivel joints and the like, and it is a general object of the invention to provide a simple, practical, improved structure of this general character.

So-called plastic material, known generally under the name of "Teflon," which material is polytetrafluoroethylene, has certain characteristics that are highly desirable in seals or packings and which are particularly desired in seals or packing of swivel joints and the like. In such devices, fluids of various kinds frequently are handled at high temperatures apt to have detrimental effect upon commonly known fluid seals. In most cases, such temperatures can be effectively resisted by the type of plastic mentioned, which plastic will be hereinafter referred to as "Teflon."

However, high temperatures are not the only factors requiring consideration in the design of a swivel joint, since these devices are also frequently employed to handle fluids at high pressure, and in many instances the high pressures encountered are subject to considerable variation. In order to maintain an efficient fluid seal in the presence of fluctuating high pressures, the sealing element of a swivel joint should be somewhat resilient. Teflon, though effectively resisting high temperatures and inert to most fluids lacks resilience or is very low in resilience, and because of this it is in ordinary constructions unsatisfactory and impractical as packing or sealing material.

It is an object of the present invention to provide a packing or seal for a swivel joint in which full advantage is taken of the chemically inert and temperature resistant qualities of Teflon, and in which means are provided for supplying to the seal the desirable resilient characteristics that are lacking in Teflon.

Another object of the present invention to provide a packing or seal, preferably an annular structure that is particularly useful and practical in swivel joints and the like, and which consists of but two simple inexpensive, highly effective elements.

Another object of this invention is to provide a packing or seal of the general character referred to characterized by a sealing ring of Teflon of such form and shape as to act effectively and efficiently as a seal while a pressure ring serves to maintain pressure on the sealing ring keeping it in effective sealing engagement with parts between which the seal is maintained.

Another object of this invention is to provide a packing or sealing ring of the general character referred to consisting of but two simple annular elements, one a sealing ring and the other a pressure ring, which pressure ring is within the sealing ring and is effective to urge the seal ring radially and, at the same time, axially in opposite directions.

Another object of this invention is to provide a seal construction for a swivel joint, consisting of a seal ring and a pressure ring interengaged in a manner to normally remain in assembled relation with the pressure ring so seated within the sealing ring that the pressure ring is held out of engagement with the relatively movable elements of the swivel joint between which leakage is to be controlled.

Another object of this invention is to provide a construction embodying in combination a sealing ring of Teflon, a pressure ring actuating the sealing ring and a holding ring engaged with and preferably surrounding the sealing ring, holding it against radial expansion so that the forces generated by the pressure ring operate to spread the sealing ring axially.

The various objects and feature of my invention will be fully understood from the following detailed description of a typical preferred form and application of my invention, throughout which description reference is made to the accompanying drawings, in which:

Fig. 1 is a side elevation of a typical simple swing joint or swivel connection wherein the swivelly connected elements are sealed by means of a sealing or packing embodying the invention, parts being broken away to show details of the construction. Fig. 2 is an enlarged detailed sectional view of the sealing ring as provided by the invention. Fig. 3 is an enlarged detailed transverse sectional view of the holding ring for the sealing ring that may be used in carrying out the invention. Fig. 4 is a view of the pressure ring employed in carrying out the invention with a portion broken away to illustrate the form and construction. Fig. 5 is an enlarged sectional view of the sealing ring and pressure ring combined with the holder as shown in Fig. 1, showing these parts free of other construction. And Fig. 6 is an enlarged detailed sectional view of a portion of the structure shown in Fig. 1, showing the structure provided by the invention in operating condition.

The structure as provided by the present invention is characterized generally by a main sealing ring A formed of Teflon and preferably a unit of continuous annular form and uniform in cross sectional configuration. The structure further includes, a pressure ring B combined with and acting upon the sealing ring A, which pressure ring is resilient and acts on the sealing ring to normally yieldingly maintain expansive pressure thereon so that parts of the sealing ring are maintained in sealing engagement with the parts of the structure in which the seal is used. In the preferred form of the invention and in the particular case illustrated, a third element is employed and is in the form of a holding ring C which, in practice, may be a simple annular member surrounding the sealing ring, and in effect, holding it so that expansion of the sealing ring under the influence of the pressure ring is confined to axial expansion.

In accordance with the broader principles of the invention the sealing ring as provided by the present invention can be employed in or applied to various structures. The sealing ring is particularly practicable as applied to swivel joints adapted to handle fluid under pressure, and therefore it is shown in the drawings, as applied to such a structure.

The particular swivel joint illustrated in the drawings includes two main sections E and F, the section E being a female section having a socket 10 entering it from one end while the section F is a male section having a pin portion 11 entering or extending into the socket. A suitable anti-friction bearing means rotatably supports the pin 11 in the socket 10 and holds the pin in the socket.

In the particular case illustrated, the bearing means includes axially spaced annular series of bearing balls 112 carried in registering grooves provided in the wall of the socket 10 and the exterior of the pin 11.

A suitable simple seal 15 is shown provided in the socket 10 outward of the bearing means, and in the particular case illustrated, the socket has a reduced portion or counterbore 20 at is inner end terminating in a bottom 21, and the pin 11 has reduced extension 12 protruding from a radial shoulder 31 of the pin 11 and entering the counterbore.

The parts just referred to establish an annular chamber 13 in the structure between the joint sections E and F, and it is this chamber that carries or accommodates the seal embodying the present invention. In the particular case illustrated the joint sections E and F have central flow passages 15a and 15b of substantially the same diameter and in register with each other so that fluid may be conducted through the joint. In the particular construction illustrated the terminal end 22 of the extension 12 is spaced from the bottom 21 so that there is a flow passage 23 between the sections admitting fluid handled by the swivel joint to the annular chamber 13 as clearly shown in Fig. 6 of the drawings.

When the structure as provided by the invention is applied to a structure of the general character above mentioned, the seal or structure provided by the invention may involve merely the sealing ring A and the pressure ring B; however, in most cases and for most services it is preferred to include in the seal the holding ring C and, therefore, in the form of the invention illustrated the holding ring C is included.

In the particular construction illustrated the holding ring C is a simple, continuous annular member, the outer circumferential surface 30 of which is axially straight and turned so that the ring C slides into the counterbore 20 and has one end seated against the bottom 21 while the other end opposes and may be engaged by the end 31 of the pin 11. In the case illustrated the holding ring C has a simple cylindrical interior surface 32. As a result of the construction just described, the holding ring C, when in place, in effect fits into the outermost portion of the annular chamber 13 and provides a metal closure for the gap or opening 33 that occurs in the structure between the shoulder 31 of the pin and the socket 10 at the mouth of the counterbore 20.

The sealing ring A as provided by the present invention is preferably a continuous annular body or unit of Teflon and in the preferred form it has an outer face 40, an inner face 41 and side faces 42. The outer face 40 of the Teflon ring is preferably straight axially and round so that it fits snugly into interior 32 of the holding ring C, and this part of the sealing ring is preferably co-extensive axially with the holding ring C. The side faces 42 extend radially inward from the outer face 40 and preferably diverge when the sealing ring is free or in a condition such as is shown in Figs. 2 and 5. The side faces 42 in the case illustrated are of equal extent radially and when the seal is in operating position in the joint construction one of the side faces 42 engages and has sealing engagement with the bottom 21 of the counterbore 20, while the other engages and has sealing engagement with the radial shoulder 31 of the pin 11. The inner wall 41 of the sealing ring is of such diameter as to surround the pin extension 12 with substantial clearance leaving the inner peripheral portion of chamber 13 completely unoccupied by the sealing ring.

The pressure ring as provided by the present invention is a resilient element and acts on and normally yieldingly engages the sealing ring to effect expansion or urging thereof so that sealing engagement is maintained by the sealing ring. In the particular form illustrated the pressure ring is in direct engagement with the sealing ring and where the sealing ring is in a holding ring C the function of the pressure ring is to expand or urge the sealing ring axially so that the side faces 42 are pressed apart or in opposite directions axially of the seal.

In the particular form of the invention under consideration there is a meshed or permanently engaged relationship between the rings A and B, the ring A being provided with a groove or channel 50 that receives and carries at least a portion of the pressure ring B. In the preferred construction the groove or channel 50 is a continuous uniform annular groove provided in the inner face 41 of the sealing ring. In the case illustrated the groove 50 is located midway between the side faces 42 and is of appreciable depth, with the result that the sealing ring is substantially U-shaped in cross-sectional configuration and has spaced side portions X, to be moved apart or axially away from each other as by the action or pressure of the pressure ring B. In the particular case illustrated the groove 50 is shown as having substantially flat opposed sides 51 and a rounded bottom 52.

The pressure ring B as provided by the present invention is preferably a continuous annular unit of rubber or rubber-like material so that it has a substantial amount of resilience, and it is of such diameter and of such cross section as to be received in the groove 50 of the sealing ring and to be under appreciable pressure or compression when the seal is in operation as shown in Fig. 6, with the result that it continuously and uniformly presses or acts on the sealing ring to maintain effective sealing engagement between the sealing ring and the sections E and F of the joint. In the particular case illustrated the pressure ring is round in cross section and is proportioned to fit snugly into the bottom portion at least of the groove 50 when the sealing ring and pressure ring are assembled as shown in Fig. 5. When the term "rubber" is used in connection with the pressure ring B it is meant to include not only rubber but any suitable rubber-like material.

In practice it is preferred that the divergence of the side walls 42 of the sealing ring be such that when the seal is in operating position as shown in Fig. 6 the side portions X of the sealing ring are forced or flexed somewhat toward each other bringing the side walls 42 into parallel relationship with consequent compression of and possible distortion of the pressure ring. As shown in Fig. 6 the pressure ring initially or normally is round in cross section but, when in action, is flattened somewhat and may project radially inward from the inner wall 41 of the sealing ring, though it at all times remains clear of the joint construction so that it does not engage any part thereof.

With the construction described and as clearly shown in Fig. 6 of the drawings, under normal working conditions the pressure ring is under pressure or compression between the spaced side portions X of the sealing ring and thus yieldingly urges these portions of the ring apart or axially away from each other with the result that the side walls 42 are maintained in effective sealing engagement with the joint sections even though the sealing ring in and of itself has little or no resilience.

In carrying out the invention the material employed in the pressure ring may be varied depending upon fluid to be handled by the structure, and commercially various rubber-like compositions are available that will effectively resist most fluids and which will serve to effectively act on and press the non-resilient Teflon when the parts are related as provided by this invention.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A sealing ring for controlling leakage between parallel surfaces of relatively movable members, comprising an annulus of flexible material having side walls diverging radially inwardly and having an inner circumferential wall surface provided with an annular groove defined by a bottom and side walls of arcuate cross-section, and a pressure ring having a uniform cross section of a diameter substantially equal to the distance between the side walls of said groove, the outside diameter of said pressure ring being substantially equal to the inside diameter of the annulus measured through the bottom of the groove, said pressure ring being of resiliently deformable material completely filling said groove and extending radially inwardly beyond the mouth thereof, whereby when the sealing ring is positioned between said parallel surfaces, the side walls of the annulus are flexed toward each other resulting in part of said pressure ring being extruded radially inwardly beyond the confines of the groove.

2. A sealing ring for controlling leakage between opposed surfaces of relatively rotatable members, comprising an annulus of flexible material having opposed diverging walls for respective engagement with said surfaces, said annulus being provided with an annular groove positioned intermediate the divergent walls thereof, said annular groove being defined by a bottom and side walls of arcuate cross section, and a pressure ring of resiliently deformable material disposed in and completely filling said groove and extending outwardly beyond the mouth thereof, said ring having a uniform cross sectional diameter substantially equal to the distance between the side walls of said groove, whereby when the sealing ring is positioned between said opposed surfaces of the members, the divergent walls of the annulus are flexed toward each other resulting in part of said pressure ring being extruded outwardly beyond the confines of said groove.

References Cited in the file of this patent

UNITED STATES PATENTS

| | | |
|---|---|---|
| 1,955,157 | Wayne | Apr. 17, 1934 |
| 2,421,659 | Sutton et al. | June 3, 1947 |
| 2,494,598 | Waring | Jan. 17, 1950 |
| 2,509,090 | Faccou | May 23, 1950 |
| 2,509,118 | Warren | May 23, 1950 |
| 2,512,883 | Warren | June 27, 1950 |
| 2,580,546 | Hobson | Jan. 1, 1952 |
| 2,705,177 | Waring | Mar. 29, 1955 |